Figure 1:
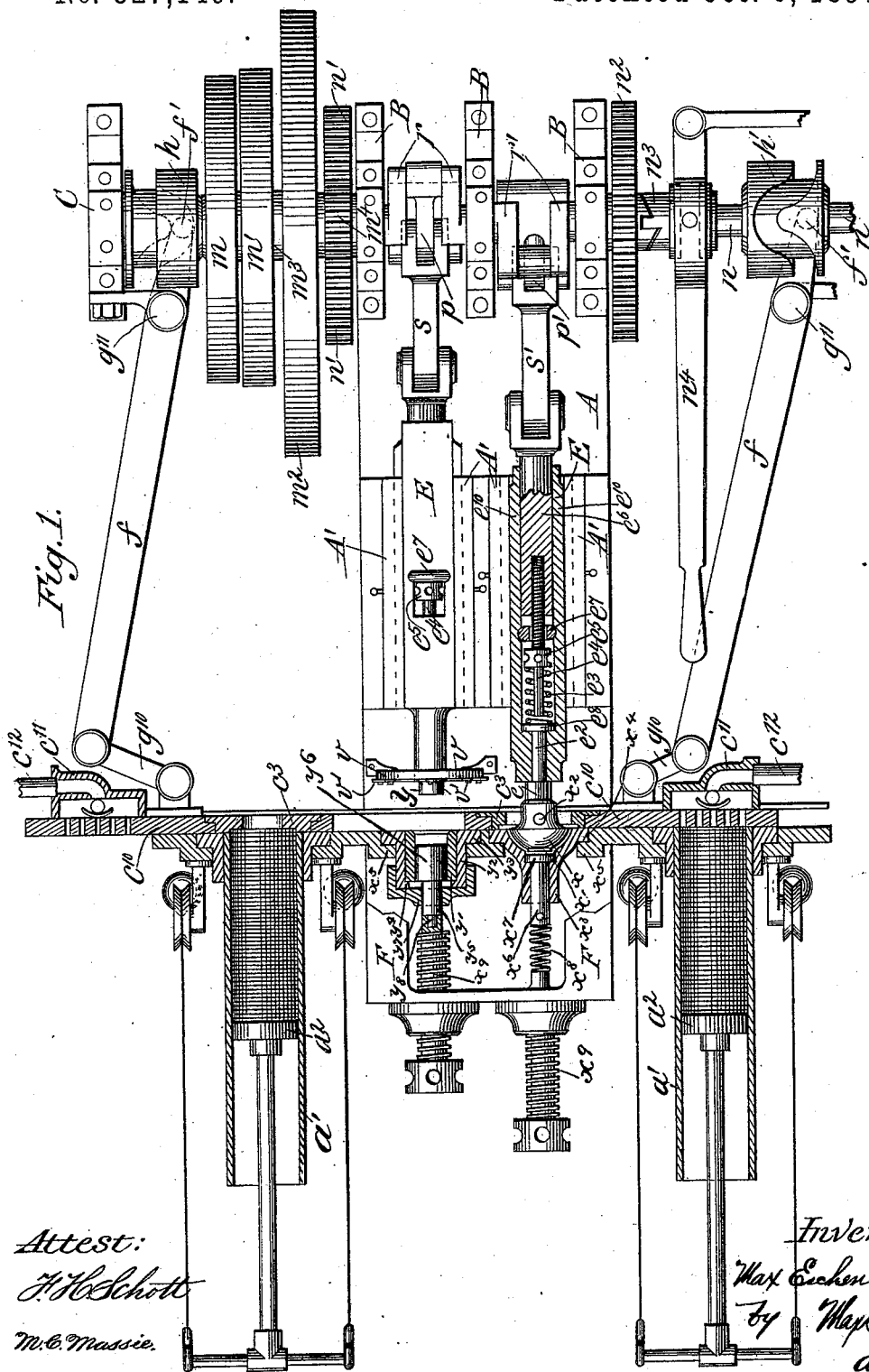

(No Model.) 4 Sheets—Sheet 1.

M. ESCHENBECK.
MACHINE FOR MANUFACTURING BOXES OR PLATES.

No. 527,146. Patented Oct. 9, 1894.

Attest:
F. H. Schott
M. C. Massie.

Inventor:
Max Eschenbeck
by Max Fengu
Attorney (No Model.) 4 Sheets—Sheet 2.
M. ESCHENBECK.
MACHINE FOR MANUFACTURING BOXES OR PLATES.
No. 527,146. Patented Oct. 9, 1894.
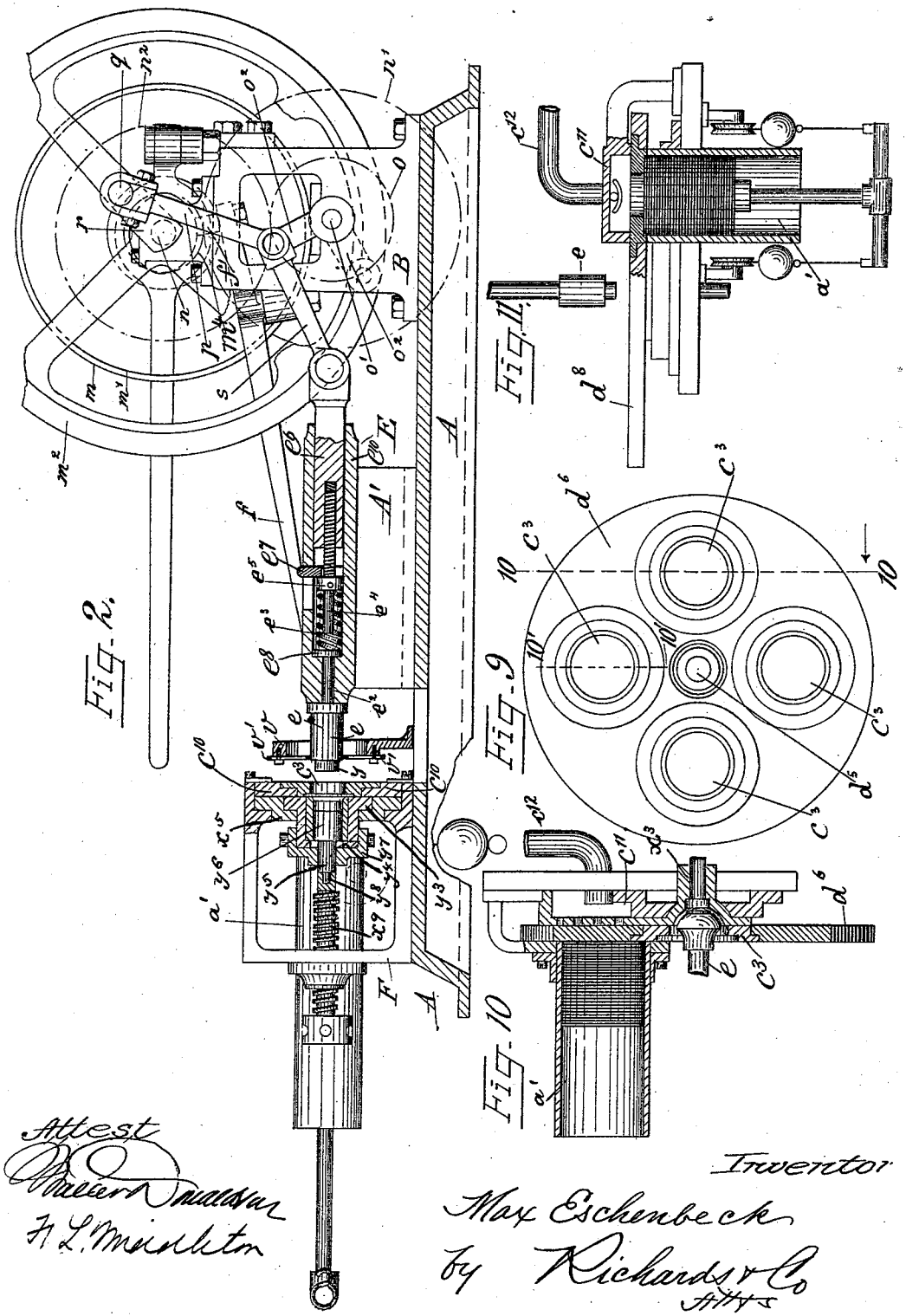
Attest
Inventor
Max Eschenbeck
by Richards & Co
Att'ys (No Model.) 4 Sheets—Sheet 3.
M. ESCHENBECK.
MACHINE FOR MANUFACTURING BOXES OR PLATES.
No. 527,146. Patented Oct. 9, 1894.
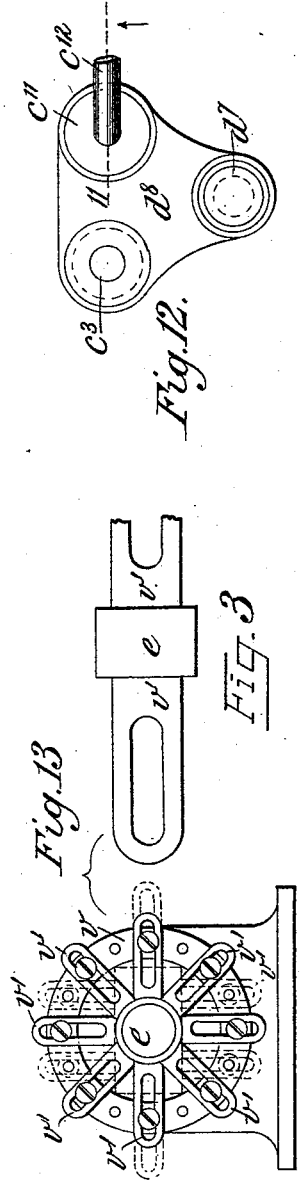
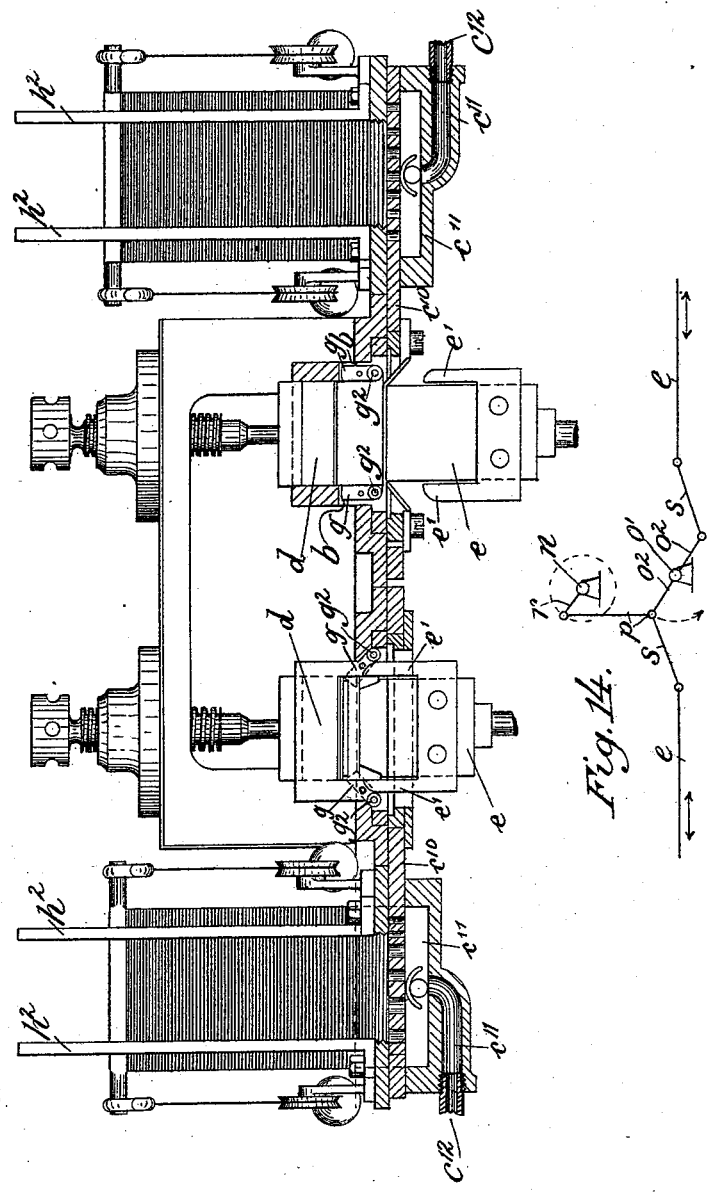

(No Model.) 4 Sheets—Sheet 4.
M. ESCHENBECK.
MACHINE FOR MANUFACTURING BOXES OR PLATES.
No. 527,146. Patented Oct. 9, 1894.
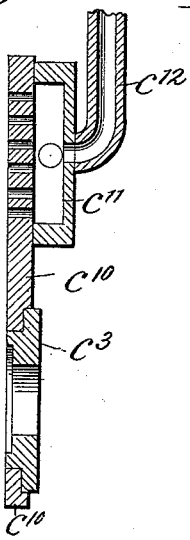
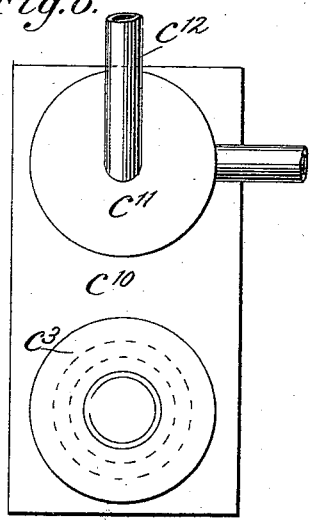
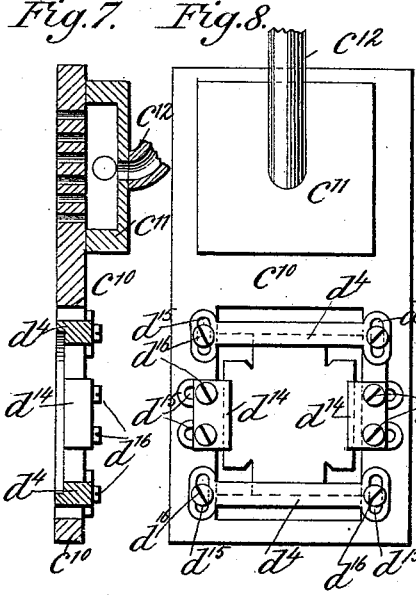
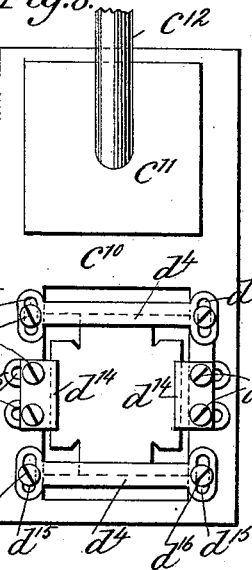
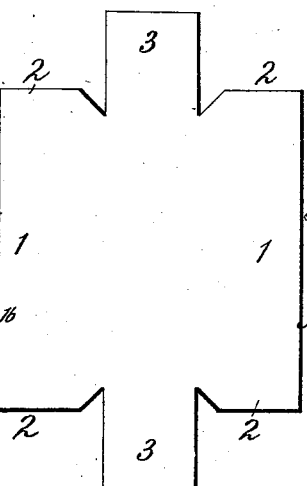
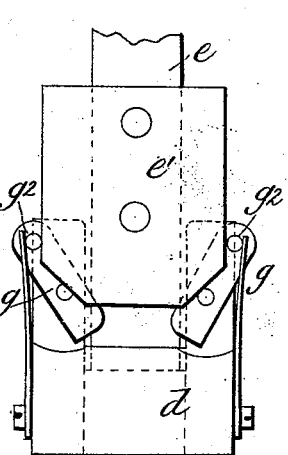
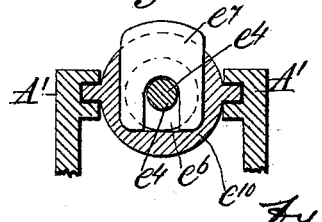
Attest:
F. H. Schott
M. C. Massie.
Inventor
Max Eschenbeck

UNITED STATES PATENT OFFICE.

MAX ESCHENBECK, OF JERSEY CITY, NEW JERSEY, ASSIGNOR TO JULIUS MOHS, OF DRESDEN, GERMANY.

MACHINE FOR MANUFACTURING BOXES OR PLATES.

SPECIFICATION forming part of Letters Patent No. 527,146, dated October 9, 1894.

Application filed September 22, 1893. Serial No. 486,248. (No model.) Patented in Germany August 27, 1892, Nos. 70,794 and 71,017.

*To all whom it may concern:*

Be it known that I, MAX ESCHENBECK, a subject of the Emperor of Germany, residing at Jersey City, Hudson county, New Jersey, United States of America, have invented certain new and useful Improvements in Machines for Manufacturing Boxes or Plates, (patented in Germany August 27, 1892, Nos. 70,794 and 71,017,) of which the following is a specification.

My invention relates to improvements in box-making machines.

The object of my invention is to produce a machine particularly adapted for the production of paste-board boxes, although my invention may be applied to machines for manufacturing tinware or other articles produced by presses.

My invention consists in a particular form of steaming device, by means of which the box-blanks may be steamed before pressing, in order to soften the blanks and render them more plastic than usual.

My invention consists further in a special mechanism for bending the ends of the longitudinal side-pieces of cornered boxes, prior to the bending of the cross-side pieces.

My invention also consists of such features, details and combinations of parts, as will first be described in connection with the accompanying drawings, and then particularly pointed out in the claims.

In the drawings—Figure 1 is a plan view, partly in section, of a duplex box machine embodying my invention. Fig. 2 is a longitudinal section, partly in elevation, of the same. Fig. 3 is a detail view of part of another form of machine embodying my invention. Fig. 4 is a detail view of the end-folding device employed in connection with the modification shown in Fig. 3. Figs. 5 to 12 are detail views, illustrating several forms of carrier-plates of my invention. Fig. 13 is a detail view of a stripper device of my invention. Fig. 14 is a diagrammatic view which will be referred to hereinafter. Fig. 15 is a plan view of a box-blank. Fig. 16 is a detail transverse section of the plunger, showing the key, $e^7$, in elevation.

Referring particularly to Figs. 1 and 2, of the drawings, A is a bed plate, provided with the pillow-blocks, B, bolted to the bed-plate and having two sets of journal-boxes, in which are mounted the shafts, $o'$ and $n$, the outer ends of the shaft, $n$, being further supported by outboard bearings, C, only one of which is shown in Fig. 1.

Upon the shaft, $n$, near one end, is mounted a sleeve, $m^3$, upon which revolves a loose pulley, $m$, a tight pulley, $m'$, being fixed to the sleeve, and serving to communicate motion to the same. To the sleeve, $m^3$, is attached, also, a fly wheel, $m^2$, and a gear pinion, $m^4$, which meshes into a gear wheel, $n'$, fixed on the shaft, $o'$.

To the opposite end of the shaft, $o'$, is fixed a gear pinion, $o$, which meshes into a gear wheel, $n^2$, loosely mounted on the shaft, $n$, and arranged to be locked to the said shaft by a clutch, $n^3$, which is shifted into and out of operation, by a clutch lever, $n^4$.

It is obvious that when the gear wheel, $n^2$, is locked to the shaft, $n$, the latter will be rotated. The central portion of the shaft, $n$, is provided with two cranks, $r$ and $r'$, while, at each end of said shaft, are fixed the cams, $h$, $h'$, having peripheral cam-slots, into each of which enters a pin, $f'$, on the end of a shifting lever, $f$, these levers being fulcrumed at $g^{11}$. These levers will be again referred to hereinafter.

To the base-plate are fixed slide-ways, $A'$, in which move the plungers, E, which are pivoted to the ends of the connecting rods, $s$, $s'$, these connecting rods being pivotally attached to crank rods, $p$, $p'$, and to guide arms, $o^2$, the latter being loosely mounted on the shaft, $o'$, while the crank rods engage the central portions, $q$, $q'$, of the cranks, $r$, $r'$, previously described.

Each plunger, E, is preferably constructed with an outer shell, $e^{10}$, into which enters a central core, $e^6$, which is attached to its connecting rod, $s$ or $s'$. The lower end of the outer shell has a central axial opening in which is held a shank, $e^2$, of the male die, one end of the die-shank having a head, $e^8$, against which bears a helical spring, $e^3$, loosely mounted in the shell. Within the spring projects a guide-rod, $e^4$, which is threaded into a central axial hole in the central core, being provided with a collar, $e^5$, against which the spring, $e^3$, bears, the said collar having spanner holes, by means of which the guide-rod may be adjusted so as to permit its free end to contact with the head, $e^8$, on the shank of the male die. To permit access to this collar for the purpose of such adjustment, a portion of the shell is cut away, as shown. A forked key, $e^7$, (shown in Fig. 16,) is let into a suitable recess in the shell, and is arranged to straddle the guide-rod, $e^4$, between the collar and the end of the central core, the said guide-rod being free to move longitudinally within the fork of said key until the collar contacts with the key, whereupon a further movement of the core and guide-rod will move the shell with them.

To the base-plate is secured a frame, F, which carries the female dies, which are interchangeable, and may be of various forms, to suit the shape of box or other article which it is desired to make. In Fig. 1, I have shown two forms of female dies with their corresponding male dies.

The dies shown at the lower side of the sheet are intended for use in manufacturing saucer-shaped boxes, while the pair illustrated at the upper side of the drawings are for the manufacture of cylindrical boxes.

The first-mentioned dies for making saucer-shaped boxes comprise a male die, $x$, having a rounded lower end with a projecting portion, $x'$, this male die being attached to the lower end of the plunger, $e^2$, by a pin, $x^2$. This male die enters a correspondingly-shaped female die, $x^3$, which is provided with flanges, $x^4$, adapted to be engaged and held by flanges, $x^5$, integral with the frame, F. The lower end of the female die is provided with an opening arranged to receive a lower plunger, $x^6$ which has a head, $x^7$, resting in a recess within the female die, and is pressed toward the male die by a spring, $x^8$, which is attached to a screw, $x^9$, threaded through the bottom of the frame, F.

The dies shown in the upper side of Fig. 1 and also in Fig. 4, comprise an ordinary cylindrical male die, $y$, secured to the plunger, $e^2$ in any suitable way and arranged to enter a female die, $y'$, held within a receptacle, $y^2$, which has flanges, $y^3$, at its upper end arranged to be engaged and held by flanges, $x^5$, formed integral with the frame, F, the said receptacle also having flanges, $y^4$, which prevent the downward movement of the female die. The lower end of the receptacle is provided with an opening through which passes a lower plunger, $y^5$, having a cylindrical head or portion, $y^6$, movable within the female die, said lower plunger being guided in an opening in a yoke or bottom piece, $y^7$, fixed to the receptacle in any suitable way. The lower end of the lower plunger is held, by a dowel joint, $y^8$, to a screw $x^9$, by means of which the height of the piston, $y^6$, within the female die, may be adjusted so that the same female die may be used with male dies of varying depths. The spring, $x^8$, may be adjusted in tension by its screw, $x^9$, and serves to force out the completed box from its female die, as will be fully understood by those skilled in the art. The frame, F, also carries, at each side, a magazine, $a'$, having a piston or plunger, $a^2$, which is pressed forward, preferably by weights.

Over the female-dies move carrier-plates, $c^{10}$, attached by links, $g^{10}$, to the shifting levers, $f$. Each carrier-plate is provided with a series of perforations at one end, and with a recess at the other end, into which is fitted a blank-carrier, $c^3$, these blank-carriers having central openings the size of the male-die, and blank-receiving recesses next to the frame, F. Each carrier-plate is arranged to be moved back and forth by its lever, $f$, in such a manner that its blank-carrier will alternately come opposite the mouth of the magazine and female die, it being understood that when in the latter position the perforations in the carrier-plate will then be opposite the mouth of the magazine. In line with the magazine are fixed caps, $c^{11}$, provided with steam-inlet pipes, $c^{12}$, by means of which steam is conveyed to the interior of the cap, $c^{11}$, and into the mouth of the magazine, when the perforations come opposite the mouth of the magazine, the pipe, $c^{12}$, being flexibly connected with any source of steam supply.

The magazine is arranged to receive the box-blanks, and feeds them to the blank-receiving recess in the blank-carrier, when the latter comes opposite the magazine, the blanks being forced from the magazine by the piston, the outermost blank being steamed before passing to the dies, by means of the steam coming through the inlet-pipe, $c^{12}$, cap, $c^{11}$, and the perforations in the feed-slides, or carrier-plates.

When the blank comes opposite the dies, the male die descends through the central opening in the blank-carrier and forces the blank into the female die, where it is pressed into shape. It will be seen that when the shaft, $n$, makes one revolution, its cranks, $r$, $r'$, and crank-arms, $p$, $p'$, will swing the guide-arms, $o^2$, across the lines joining the shaft, $o'$, and the plunger axes, and will draw said guide arm back again across said lines. In other words, each connecting rod and its respective guide arms will be in the same longitudinal plane twice during each revolution of the shaft, $n$, and at such times, the male die is at the extreme limit of its movement toward the female die. In this way, the box-blank will be pressed twice and will then be withdrawn by the male die as the latter moves away from the female die.

In all those box-machines previously constructed, of which I have any knowledge, the male die is raised from the female die in the interval between the first and second pressing of the box-blank and therefore the latter is liable to be displaced by the movement of the male die after the first pressing, so that when the second pressing occurs, the box-blank, not being in its proper position, is spoiled by the second pressing. By my construction, the plunger does not move as far away from the female die after the first pressing as it does after the second pressing, and the male die is held in close contact with the female die by the spring, $e^3$, acting against the head of the die-shank, as will be apparent from the drawings.

In the modification shown in Fig. 3, which represents a machine arranged to manufacture boxes having corners, the magazine consists of a series of rods, $h^2$, attached to the framework of the machine, and adapted to receive the box-blanks, the piston being in this case what is often termed a "follower." In this construction, a blank of somewhat different form is used, such a blank being shown in Fig. 15, and consisting of longitudinal side-pieces, 1, having ends, 2, arranged to be bent transversely, after which the cross side-pieces, 3, are bent up against the ends, 2, and secured by suitable adhesive material. When first the male die forces the box-blank against the female die, the longitudinal side pieces are bent into their proper position, and it then becomes necessary to bend the ends of the said longitudinal side-pieces at right angles. For the purpose of doing this, I provide my machine with arms or fingers, $g$, pivotally attached to the female die and resting in recesses therein. As soon as the male die has bent the longitudinal sides into shape, the continued descent of the plunger causes the fingers to engage the ends of the longitudinal sides and force them toward each other, after which the further descent of the plunger releases the fingers, and the cross-side pieces are then bent into position.

The mechanism employed for the purpose of performing the operation of bending the ends of the longitudinal slides may be variously modified, but the preferred construction is shown in Fig. 4.

In Figs. 3 and 4, $e$, is a male die which is provided with a plate, $e'$. The female die, $d$, is slotted, as at $b$, to receive the fingers, $g$, which are pivoted in the said slots and provided with studs, $g^2$, arranged in the path of the plates, $e'$, the latter being beveled on their outer corners to engage the said studs, $g^2$, thereby swinging the fingers inward and causing them to fold the ends of the longitudinal sides inward, after which, by the continued descent of the plunger, the partly folded blank is forced farther into the female die the ends of the longitudinal sides being carried past the ends of the fingers, $g$, and the cross-side pieces folded against the said end pieces. As the plunger moves away from the female die, it draws the box with it, and, when the latter is entirely freed from the female die, it is stripped from the male die by suitable strippers.

The stripper device, as seen in Fig. 13, consists of an open plate, $v$, attached to the framework of the machine, being provided with a series of radially adjustable arms, $v'$, which are secured to the plate by any suitable means. The inner ends of the arms are preferably concave, and may be moved into contact with the male die, in which position they are secured by tightening their respective screws. It will be seen that by this arrangement, the stripping device may be employed either for round or cornered boxes.

In the construction shown in Fig. 3, I employ a feed slide similar to the one illustrated in Figs. 7 and 8, in which the blank is held in place by cross strips, $d^4$, and stop plates, $d^{14}$, which prevent the magazine plunger from forcing the blanks entirely through the opening in the blank-carrier. The cross strips and stop plates are each provided with slots, $d^{15}$, through which screws or bolts, $d^{16}$, pass, to secure the said strips and plates to the feed slide, thereby permitting an adjustment of the said strips and plates for varying sizes of blanks.

Figs. 9 and 10 show one modification of carrier-plate, $d^6$, which is circular and has a series of interchangeable blank carriers, $c^3$, let into it. In this construction, the magazine, $a'$, is on the same side of the carrier-plate as the male die and plunger, the steam-box being below the carrier-plate, as will be fully understood from the drawings. The carrier-plate is revolved about its center, $d^5$, by any suitable means, such as, for instance, a belt applied to a pulley on its central axis. The features not specially described, such as the blank-carriers and the dies, together with the plunger and means for operating it, may be of a construction similar to that described and shown in Fig. 2.

In Figs. 11 and 12, I have shown an oscillating carrier-plate, $d^8$, which is pivoted at $d^7$, and provided with one blank carrier of the construction previously given, the steam-box being on the same side of the carrier-plate as the plunger, $e$, and provided with steam through a pipe, $c^{12}$. The magazine is on that side of the carrier-plate opposite the plunger, as in the machine shown in Figs. 2, 3 and 4. The carrier-plate may be oscillated so as to move the blank-carrier from the steam-box and magazine to the plunger, by any suitable device, such as a rock-shaft connected to the blank-carrier at its pivotal point, $d^7$, and operated by a connecting rod driven in any suitable manner.

Fig. 14 is a diagrammatic view, illustrating the manner in which two machines of my construction may be coupled so as to operate from one shaft. In this figure, $e, e,$ are the reciprocating plungers, $s$ are connecting rods, $o^2, o^2,$ are the two arms of a lever pivoted at $o'$, while $p$ is a pitman connected to the crank, $r$, fixed on the shaft, $n$. The reference letters applied to these various parts are the same as those used on the similar parts in the form of machine shown in Figs. 1 and 2.

It will be observed that by my construction, the blank-carriers, $c^3$, may be removed from the carrier-plates, $c^{10}$, and hence blank carriers of various interior dimensions may be used on the same machine for the manufacture of various sizes of boxes.

Having thus fully described my invention, what I claim as new, and desire to secure by Letters Patent, is—

1. In a box-making machine, the combination, with a magazine, and a pair of dies, of a carrier-plate, a blank-carrier mounted on the carrier-plate, and having a blank-receiving recess and means for moving the carrier-plate whereby the blank-carrier is alternately brought opposite the magazine and between the dies, substantially as set forth.

2. In a box-making machine, the combination, with a magazine, and a pair of dies, of a carrier-plate, a blank-carrier mounted on the carrier-plate, a steaming device attached to the carrier-plate, and means for moving the carrier-plate, whereby the blank-carrier is brought alternately over the magazine or between the dies, and the steaming device is alternately brought over the magazine and then removed, substantially as set forth.

3. In a box-making machine, the combination, with a magazine, and a pair of dies, of a carrier-plate provided with an opening, and a series of interchangeable blank-carriers insertible in the said opening, substantially as set forth.

4. In a box-making machine, the combination, with a slotted female die, and a pair of fingers pivoted in the slots and provided with studs at their outer ends, of a plunger, and a plate attached to the plunger and provided with beveled outer corners arranged to engage the studs on the fingers when the plunger descends, substantially as set forth.

5. In a box-making machine, the combination, with a slotted female die, and a pair of fingers pivoted in the slots and provided with studs at their outer ends, of a plunger, a plate attached to the plunger and provided with beveled outer corners arranged to engage the studs on the fingers when the plunger descends, and a spring connected to each finger and arranged to return the latter to its normal position, substantially as set forth.

6. In a box-making machine, the combination, with a plunger, a die carried by the plunger, and means for giving the plunger two reciprocations, of a die-retaining device, intermediate the die and plunger whereby the die is held in contact with the blank during the second reciprocation of the plunger, substantially as set forth.

7. In a box-making machine, the combination, with a plunger, of mechanism for giving the plunger first a long reciprocation and then a short reciprocation, a die carried by the plunger, and means for holding the die stationary during the short reciprocation of the plunger, substantially as set forth.

8. In a box-making machine, the combination, with a central plunger-core having a threaded axial hole, of an outer shell surrounding the central core, a die projecting through the outer shell, a spindle screwed into the axial hole in the central core, and provided with a collar, and a spring between the die and the said collar, substantially as set forth.

9. In a box-making machine, the combination, with a shaft, a sleeve loose on the shaft, a pulley and a gear pinion fixed to the sleeve, a gear wheel meshing into the gear pinion, and a shaft on which the gear wheel is fixed, of a gear pinion on the second shaft, a gear wheel loose on the first shaft, means for locking the latter gear wheel to the first shaft, a crank attached to the first shaft, a plunger, a crank rod attached to the crank, a guide arm pivoted at one end, and a connected rod attached to the plunger at one end and to the crank rod and guide arm at the other end, substantially as set forth.

10. In a box-making machine, a stripper-device comprising an annular plate, a series of slotted fingers and a series of screws passing through the slots in the fingers and threaded into the annular plate, substantially as set forth.

11. In a box-making machine, the combination, with a carrier-plate, and a pair of slotted cross-strips, and a pair of slotted stop-plates, of a series of screws passing through the slots in the cross-strips and stop-plates and threaded into the carrier plate, substantially as set forth.

12. In a box-making machine, a stripper device comprising an open plate in combination with a series of fingers adjustably attached to the open plate, substantially as described.

In witness whereof I have hereunto set my hand in presence of two witnesses.

MAX ESCHENBECK.

Witnesses:
E. K. STURTEVANT,
H. VAN OLDENWEEL.